(12) United States Patent
Manning et al.

(10) Patent No.: US 6,602,130 B1
(45) Date of Patent: Aug. 5, 2003

(54) GRAIN CLEANER

(75) Inventors: Donald R. Manning, Merredin (AU); Brian J. Read, Merredin (AU)

(73) Assignee: Phoenixbilt Industries Ltd., Alberta (CA)

( * ) Notice: Subject to any disclaimer, the term of this patent is extended or adjusted under 35 U.S.C. 154(b) by 0 days.

(21) Appl. No.: 09/719,926
(22) PCT Filed: Jun. 16, 1999
(86) PCT No.: PCT/CA99/00565
§ 371 (c)(1), (2), (4) Date: Jul. 13, 2001
(87) PCT Pub. No.: WO99/65619
PCT Pub. Date: Dec. 23, 1999

(51) Int. Cl.$^7$ .................................................. B08B 5/00
(52) U.S. Cl. ......................................... 460/100; 209/30
(58) Field of Search ........................ 460/11, 12, 23, 460/81, 83, 97, 98, 99, 100, 103, 104, 106, 105, 119, 902; 209/30–37

(56) References Cited

U.S. PATENT DOCUMENTS

| | | | |
|---|---|---|---|
| 1,568,267 A | 1/1926 | Carter | |
| 1,625,088 A | 4/1927 | Mjolsness | |
| 1,685,512 A | 9/1928 | Varusky | |
| 2,047,508 A | 7/1936 | Ingraham | 209/96 |
| 2,181,431 A | 11/1939 | Ingraham | 209/96 |
| 2,303,249 A | 11/1942 | Ashton et al. | 209/21 |
| 2,388,343 A | 11/1945 | Schmidt | 83/36 |
| 2,672,235 A | 3/1954 | Freeman | 209/95 |
| 3,384,232 A | 5/1968 | Turnbull et al. | 209/11 |
| 3,756,406 A | 9/1973 | Khan | 209/291 |
| 4,280,900 A | * 7/1981 | Gjesdal | 209/34 |
| 4,979,622 A | * 12/1990 | Chiang | 209/33 |
| 5,409,118 A | * 4/1995 | Bielagus et al. | 209/136 |

FOREIGN PATENT DOCUMENTS

| | | | |
|---|---|---|---|
| FR | 2 553 009 | 10/1983 | ............ B07B/4/02 |
| GB | 1050755 | 8/1965 | |
| GB | 2 107 217 A | 4/1983 | ............ B07B/1/24 |

* cited by examiner

Primary Examiner—Thomas B. Will
Assistant Examiner—Meredith Petravick
(74) Attorney, Agent, or Firm—Sterne, Kessler, Goldstein & Fox, P.L.L.C.

(57) ABSTRACT

A grain cleaner has an indent cylinder assembly which includes a removable cylinder. The cylinder is removed by unwrapping it from around a frame. The grain cleaner also includes at least some augers with drop away troughs. The grain cleaner also includes grain cleaning assemblies such as, for example, indent cylinders and rotary screen drums and/or grain cleaning assemblies drive systems which are mounted on framework members capable of pivoting outwardly from the machine allowing access to machinery and components positioned centrally within the grain cleaner.

15 Claims, 8 Drawing Sheets

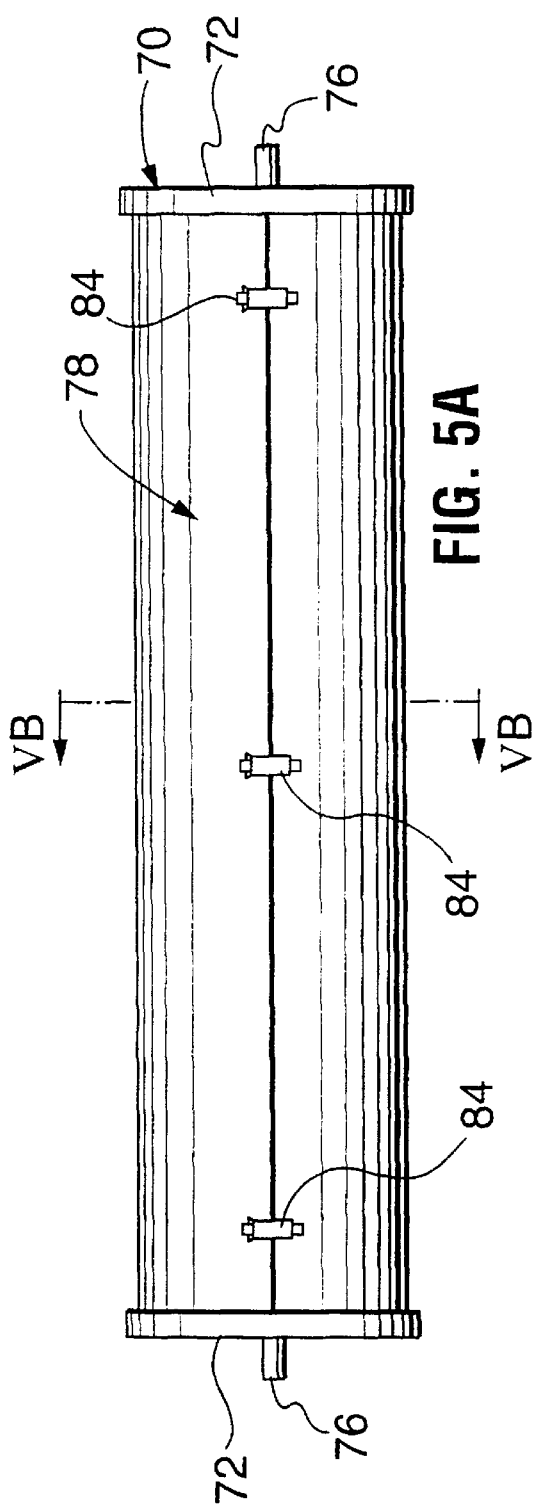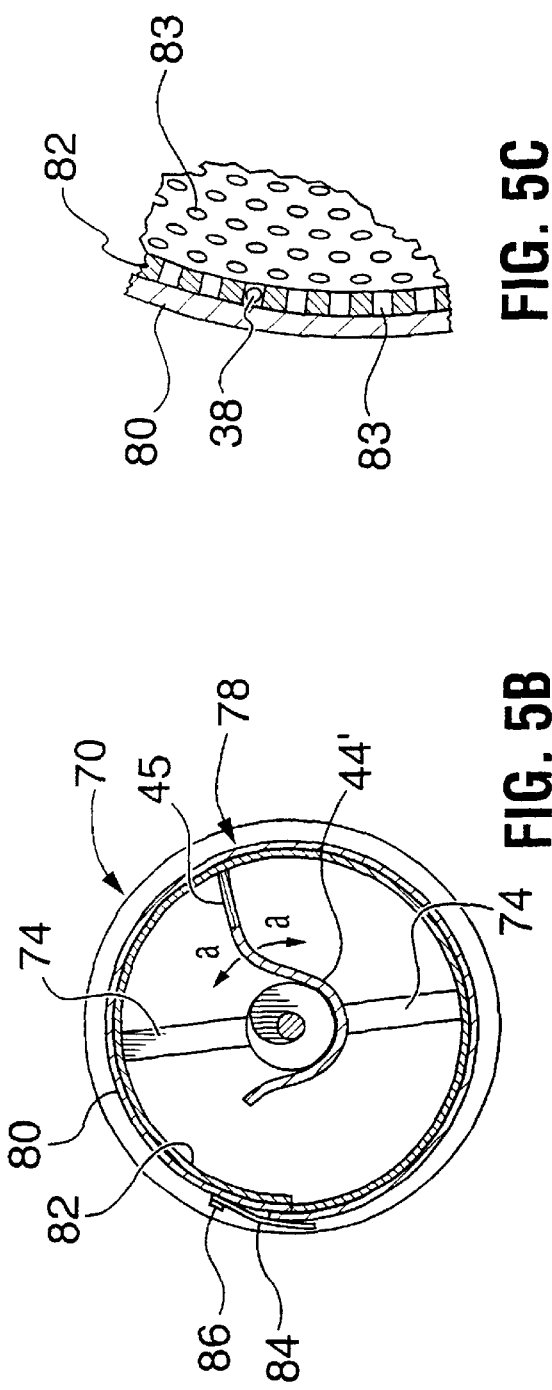

GRAIN CLEANER

FIELD OF THE INVENTION

This invention is directed to a grain cleaner for use in cleaning grain and, in particular, a grain cleaning machine which is useful for farm environments.

BACKGROUND OF THE INVENTION

Grain cleaning machines are well known. They are useful for cleaning contaminants, such as grasses, stems and weed seeds, from valuable grain. While many grain cleaning machines are known, few grain cleaners are known which are particularly useful for farmers to use and maintain themselves. Also, few grain cleaners are easily convertible to clean different types of grain and this limits their usefulness especially in large operations or cooperatives where more than one crop must be processed. In particular, most grain cleaners are designed specifically for one type of grain and cannot be converted to clean other types of grain. Many grain cleaners are also limited as to volume throughput and cannot be adjusted to effectively process any desired volume of grain.

SUMMARY OF THE INVENTION

A grain cleaner has been invented which includes features for facilitating maintenance and repair and permitting such maintenance and repair without requiring special equipment. In addition, a grain cleaner according to the present invention is convertible for use in cleaning a variety of grain types (ie. peas, wheat, canola, etc.) and, in one embodiment, can handle large volume throughput.

A grain cleaner according to the present invention can include a number of grain cleaning stages, for example, for removing oversize and undersize contaminants. In one embodiment, diverters are included for permitting by pass of one or more cleaning stages. In one preferred embodiment, an early stage cleaner is provided for removing particularly problematic oversize contaminants such as animal droppings and rocks.

In accordance with a broad aspect of the present invention, there is provided a grain cleaner comprising a framework, a grain inlet for accepting a flow of grain, grain cleaning means to separate the grain from at least some of its contaminants and a grain outlet to permit flow of the grain away from the grain cleaning means, an auger flight being disposed in the grain outlet, the auger flight including a trough and an auger, the trough being mounted to permit at least a portion of the trough to be pivoted away from the auger.

In accordance with a broad aspect of the present invention, there is provided a grain cleaner comprising a framework, a grain inlet, a screen separator drum having a long axis and supported by the framework to be rotatable about its long axis, a chute extending to conduct materials from the screen separator drum to an indent cylinder assembly, the indent cylinder assembly having a long axis and including an indent cylinder and an auger flight extending therethrough, the indent cylinder and the auger flight being supported by the framework and the indent cylinder being rotatable about the long axis of the assembly and a grain outlet to conduct materials away from the auger flight, a second auger flight being disposed in the grain outlet, the auger flight including a trough and an auger, the trough being mounted to permit at least a portion of the trough to be pivoted away from the auger to provide access to the trough below the auger.

In one embodiment, there is an auger flight under the separator screen. Preferably this auger flight includes a trough with a drop away bottom for easy cleaning.

Further chutes can be provided for conveying materials from other parts of the grain cleaner. Preferably, each chute includes an outlet to an auger flight, the auger flight providing controlled conveyance of the materials from the grain cleaner. Preferred auger flights have drop away bottoms to facilitate cleaning.

In accordance with another broad aspect of the present invention, there is provided a grain cleaner comprising a framework, a grain inlet for accepting a flow of grain, grain cleaning means to separate the grain from at least some of its contaminants and a grain outlet to permit the grain to flow away from the grain cleaning means, the grain cleaning means including at least one indent cylinder assembly, the indent cylinder assembly including a cylinder having an inner surface with a plurality of indentations formed thereon, the cylinder being formed of a sheet of material wrapped and releasably secured into a cylindrical form and mounted on a frame.

In one embodiment, the cylinder includes an outer sheet material and an inner perforated liner, the outer sheet material including a releasable locking means aligned along two opposite edges thereof for securing the outer sheet material into a cylindrical form.

To enhance the wear characteristics of the cylinder and to reduce the weight of the cylinder, the inner perforated liner is preferably formed of polymeric material.

The inner perforated liner can be secured to the outer sheet, if desired. Preferably, the inner liner is secured to the outer sheet in such a way that it is removable therefrom for ease of replacement. In one embodiment, the inner liner is secured to the outer sheet material along an edge adjacent one of the opposite edges accommodating the locking means.

In accordance with another broad aspect of the present invention, there is provided a grain cleaner comprising a main framework, a grain inlet for accepting a flow of grain, grain cleaning means to separate the grain from at least some of its contaminants and a grain outlet to permit flow of the grain away from the grain cleaning means, at least a portion of the grain cleaning means being mounted on a support frame moveably mounted to the main framework such that the grain cleaning means can be moveable between a first position and a second position on the main framework of the grain cleaner.

In one embodiment, the grain cleaner includes a second grain cleaning means mounted on a second support frame, the second grain cleaning means and the first grain cleaning means being positioned in side by side relation. The first grain cleaning means includes inside components positioned adjacent the second grain cleaning means. The first support frame, because of its moveable mounting arrangement on the main framework, can be moved away from the second grain cleaning means to provide access to the inside components.

The grain cleaning means can be moveably mounted to the main framework in any suitable way such as, for example, by use of rollers, rails or pivotal connections. The second grain cleaning means can also be moveable over the main framework, as desired.

In accordance with another aspect of the present invention, there is provided a grain cleaner comprising a framework, a grain inlet for accepting a flow of grain, grain cleaning means to separate the grain from at least some of its contaminants and a grain outlet to permit flow of the grain away from the grain cleaning means, the grain cleaning means including an air separator box including an inlet opening for permitting a flow of grain therethrough and into the air separator box, a grain exit opening positioned below the inlet opening such that grain passing through the inlet opening can drop, by gravity, into the grain exit opening, a means for generating a flow of air and directing it through the flow of grain between the inlet opening and the grain exit opening, a waste material outlet from the air box, the waste material outlet positioned such that the flow of air can pass into the waste material outlet without passing again through the flow of grain and a baffle positioned between the grain exit opening and the waste material outlet.

In one embodiment, the air separator box includes a housing formed to substantially prevent the flow of air from exiting the air box except through the waste material outlet. The air box can include a curved wall positioned opposite the means for generating the flow of air. The wall is curved to direct the flow of air toward the waste material outlet. Preferably, the height or, stated another way, the degree of extension of the baffle into the air separation box is adjustable.

In accordance with another aspect of the present invention, there is provided a grain cleaner comprising a framework, a grain inlet for accepting a flow of grain, grain cleaning means to separate the grain from at least some of its contaminants and a grain outlet to conduct the grain away from the grain cleaning means, the grain cleaning means including a scalper having a tube rotatable along its long axis and including apertures disposed through its side wall, the apertures being selected to permit passage therethrough of the grain while excluding materials of size larger than the apertures and a grain hopper for directing the flow of grain against the tube's outer surface, the hopper including a wall positioned against the outer surface of the tube, the flow of grain being retained in the hopper between the wall and the outer surface of the tube until it passes through the apertures of the tube.

In one embodiment, the hopper includes an upper opening and the tube is selected to rotate in a direction which moves materials excluded by the apertures upwardly in the hopper and out through the upper opening.

The grain cleaners of the present invention are preferably mounted on transportation means such as a trailer for transport and use in the field during harvest.

The grain cleaning means of the present grain cleaners can be any suitable means for cleaning grain such as, for example, an indent cylinder, a rotary screen drum, a scalper, an, air separator box or combinations thereof. Preferably, the grain cleaning means of the grain cleaner are positioned within a housing to provide protection against catching hands, clothes etc. in the grain cleaning means and to contain contaminants such as rocks, dirt and dust within the grain cleaner. Portions of the housing can be removable to permit access to the grain cleaning means.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings.

FIG. 5A is a front elevation view of an indent cylinder useful in the present invention;

FIG. 5B is a sectional view along line 5B—5B of FIG. 5A;

FIG. 5C is an enlarged view of a portion of a wall of the indent cylinder of FIG. 5A;

DETAILED DESCRIPTION OF THE PRESENT INVENTION

Figure 1:
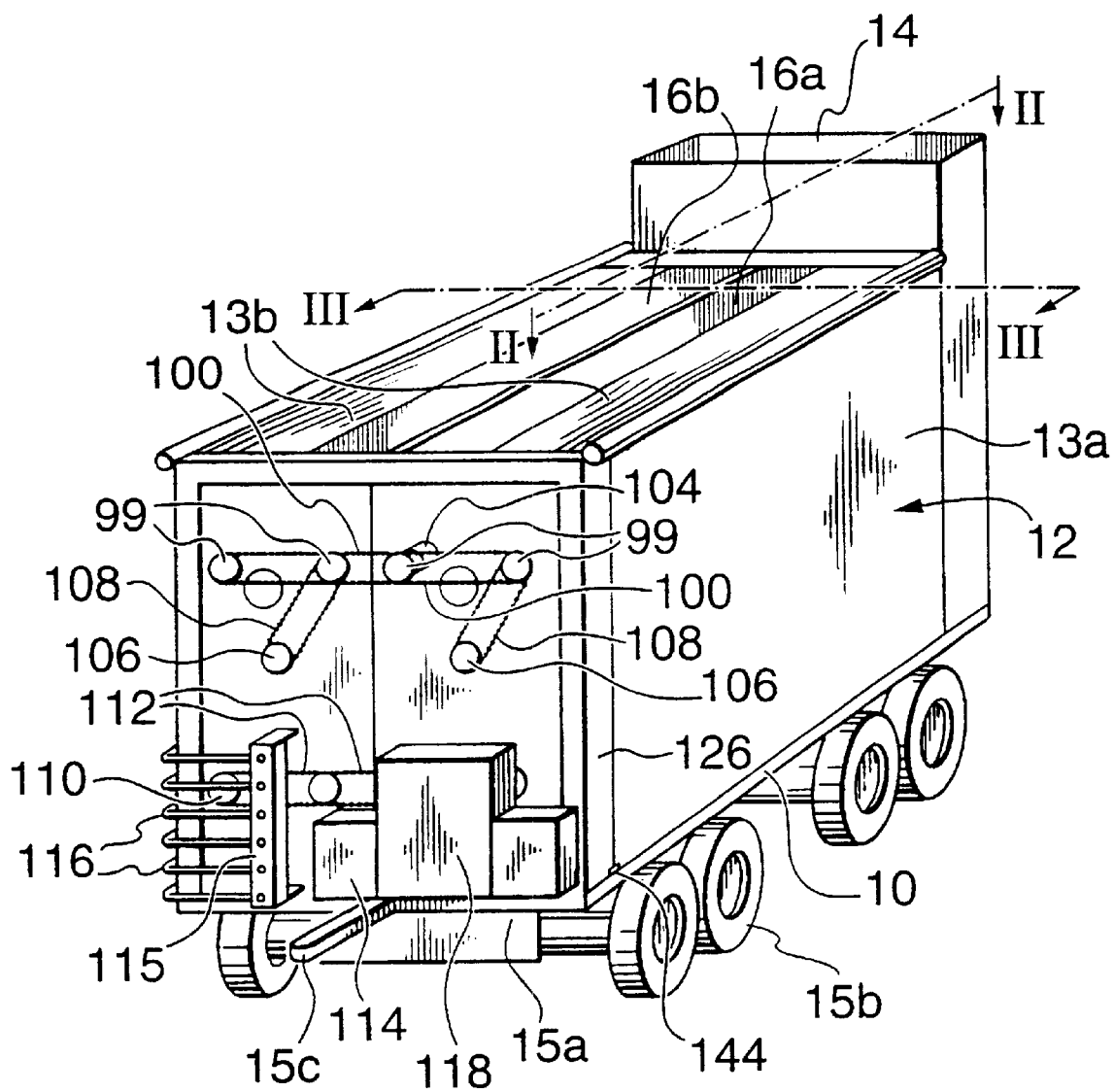
FIG. 1 is a perspective view of a grain cleaner according to the present invention.
Figure 2:
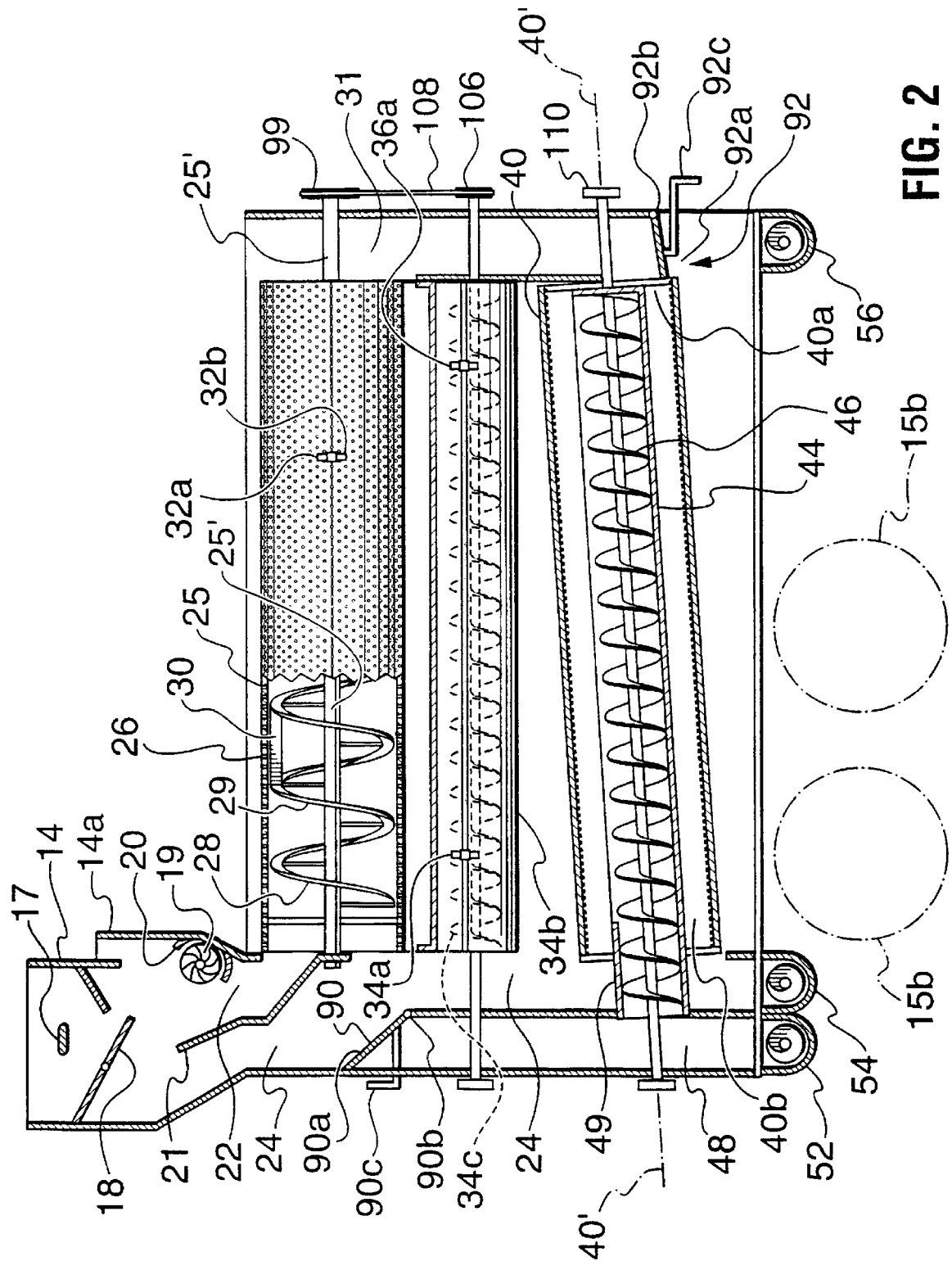
FIG. 2 is a sectional view of the grain cleaner taken along line 2—2 of FIG. 1, except that a portion of the rotary screen is not shown in section to show its outer surface.
Figure 3:
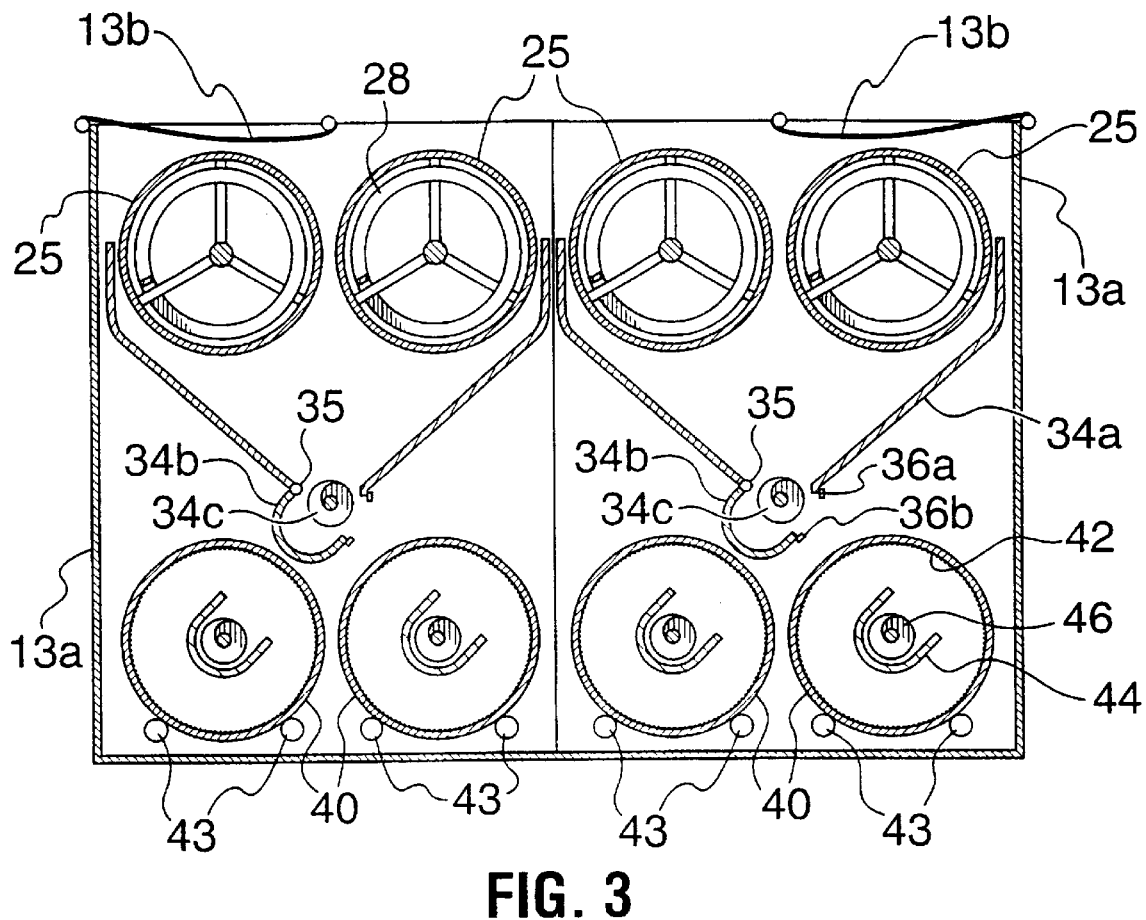
FIG. 3 is a sectional view along line 3—3 of FIG. 1.

Referring to FIGS. 1, 2 and 3, the grain cleaner includes a main framework 10 surrounded by a housing 12. Housing 12 includes side panels 13a, a pair of upper tarps 13b (shown partially retracted from their covering position over the grain cleaner components) and various other panels. Panels can be made of any suitable materials such as metal plates, polymeric materials (i.e. Plexiglas™) or tarp fabric. A hopper 14 provides an inlet through which a flow of grain can enter the grain cleaner. The grain cleaner is mounted on a trailer chassis 15a including wheels 15b and a hitch 15c for towing behind a farm vehicle (not shown).

The grain cleaner includes two grain separation modules 16a, 16b including grain cleaning components. More modules can be added, or one of the two modules can be removed, as desired and with consideration as to the application for which the grain cleaner is to be used. While the modules are illustrated including multiple grain cleaning components, modules can be provided which include fewer or more cleaning components.

Hopper 14 preferably includes a grain spreading means such as a deflection bar 17. Below deflection bar 17 is a gate 18 which is rotatable by means of a handle (not shown) outside of the hopper to control the size of the opening past gate and out of the hopper. Gate 18 acts to separate the flow of grain into a thin curtain and deflects the grain so that its flow is optimized for separation by means of a fan 19.

Fan 19 directs a flow of air toward the curtain of grain moving past gate 18. The direction of the output of air from fan 19 is adjustable by rotation of shroud 20. Shroud 20 can be rotated by actuation of a handle (not shown) extending through the hopper wall. The fan's air flow acts to separate lighter materials, such as dust and weed seeds, from the desired grain. The removal of lighter material can be optimized by rotating gate 18 to control the amount of grain and the thickness of the curtain of grain passing through the gate, by adjusting shroud 20 to control the direction of the air impinging on the grain and/or by adjusting the speed of fan 19. To permit observation of the grain separation by the fan to, thereby, facilitate the adjustment of gate 18, shroud 20 and fan 19, a wall of the hopper, for example hopper front wall 14a, can be formed of a transparent material such as polymeric glass. Preferably, the fan is elongate to act along the full length of the hopper and, thereby, to act on the full length of the curtain of grain. In a preferred embodiment, the hopper is just over 8' wide and an 8 ' fan (length) is fit therein.

A wall 21 extends into hopper 14 and separates a grain chute 22 from a waste material chute 24. Grain chute 22 opens into modules 16a and 16b. Chute 22 can be divided and gated, as desired, to properly direct grain into any number of modules. Each module includes a pair of rotary screens 25 (only one rotary screen can be seen in FIG. 2, as one screen is disposed behind the other). The rotary screens are disposed to rotate, as will be described in more detail hereinafter, about an axial shaft 25'. Each rotary screen includes an outer perforated tube 26 formed of, for example, perforated sheet metal or screen and an agitation spiral 28 mounted therein. Agitation spiral 28 need only be used if desired. However, the use of agitating spiral has been found to enhance the capacity and cleaning ability of the screens. The agitation spiral 28 includes an upstanding wall 29 arranged in a spiral fashion adjacent the tube from the input end of the rotary screen to the output end of the rotary screen. Wall 29 is fixed to shaft 25' and is driven to rotate therewith. Extending substantially parallel to shaft 25' and extending between adjacent spiralling portions of upstanding wall 29 are intermediate walls 30. Outer tube 26 is mounted about the agitation spiral and rotates with it.

As is known, rotary screens are primarily used to separate materials on the basis of size. Thus, in a preferred embodiment the perforations in the outer perforated tube 26 are of a size to prevent the desired grain from passing therethrough, while materials which are smaller than the desired grain size can pass through the perforations. The desired grain will be maintained in the rotary screen and will move therealong by action of the agitation spiral and/or by tilting of the screen toward the output end. Each rotary screen opens into a chute 31 at its output end.

To enhance the usefulness of the grain cleaner, the perforation size of the rotary screens is preferably selectable for example, by replacing at least the outer perforated tube. The tube can be replaceable in any suitable way. However, preferably, the tube is formed as a flat sheet with corresponding locks 32a, 32b adjacent two opposite edges to permit the tube to be formed by wrapping the sheet around a frame, for example a frame formed by the spiral agitator, and locking it into position using aligned locks 32a, 32b. To remove the tube, the locks can be released and the sheet unwrapped from the frame. The locking means can be any suitable means for holding the ends of the sheet together. As an example, the locks can be an overcentre hook arrangement or a fastener acting through a pair of alignable apertures.

Positioned below the rotary screens, to collect materials passing through the screens, is a funnel member 34a leading to a trough 34b containing a rotatable auger 34c. Trough 34b opens into waste chute 24. Preferably, trough 34b has a drop away bottom, as shown in FIG. 3, to facilitate cleaning. In particular, trough 34b is pivotally connected at one side edge through hinges 35 to funnel member 34a. At the opposite side edge, trough 34b is releasably locked to the funnel member by corresponding lock parts 36a, 36b. By unlocking trough 34b from the funnel member, the trough can be pivoted downwardly away from the auger so that the material in the trough can be removed by gravity or otherwise. To enhance the usefulness of the grain cleaner for operations in which large amounts of materials pass into the funnel member, a modular system is used wherein one funnel member and auger is provided to receive materials from no more than three and, preferably, no more than two rotary screens. This prevents overloading of the auger and attempts to ensure that only a handleable amount of material will be directed into each funnel member.

Figure 4:
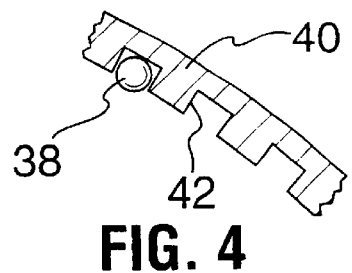
FIG. 4 is an enlarged view of an indent cylinder wall.

Referring also to FIGS. 4 and 5A to 5C, chute 31 in each module opens to a pair of indent cylinders 40. The interior wall of each indent cylinder 40 has formed therein indents 42 (FIG. 4). As best seen in FIG. 4, indents 42 are sized and shaped to accept one of the desired grains 38 (ie. a grain of wheat). The indent cylinders are disposed to rotate about their long axis 40' and are tilted downwardly from their input end 40a to their output end 40b at an angle of, for example, about 3.5 degrees from horizontal. Wheels 43 are mounted below the indent cylinders to support and stabilize them as they are rotate about their long axis. Positioned within each indent cylinder 40 is a grain collection trough 44 having an auger 46 positioned to rotate therein. As would be understood by a person skilled in the art, any grains which are sized to drop into the indents 42 are carried high on the cylinder's rotating path until gravity causes them to drop out of the indents. The trough is positioned to collect the grains falling out of the indents. A brush 45 is mounted on trough 44 and biased against the inner surface of the indent cylinder to brush off any materials which are riding up on the indent cylinder but are not positioned in one of the indents. The rotating action of auger 46 in trough 44 carries the grains to the cleaned grain chute 48.

Output end 40b of the cylinder opens into waste chute 24. Waste chute extends from hopper 14 down through the grain cleaner to collect and convey materials separated by fan 19 and passing out of trough 34b and indent cylinders 40. A cover 49 is positioned over trough 44 to prevent materials from waste chute 24 from dropping into trough 44.

As best shown in FIG. 5B, to facilitate use and cleaning, troughs 44 preferably are mounted at their ends on bearings (not shown) which permit them to be rotated about their long axis. Such a mounting arrangement permits each trough 44 to be tiltable along its long axis such that it can be adjusted to accept grains falling out of the indents at any selected angle. Preferably, the trough is mounted to be rotatable to a substantially inverted position so that materials in the trough can be removed by gravity. Alternately, the troughs can have drop away bottoms similar to troughs 34a.

FIGS. 5A to 5C show a particularly useful indent cylinder for use in a grain cleaner. The indent cylinder is formed to be easily removable and replaceable to facilitate use by the operator. In particular, the indent cylinder includes a rotary frame 70 including a pair of end rings 72 connected by spokes 74 to a pair of stub shafts 76 which are rotatable to rotate frame 70. The stub shafts are mounted on the frame of the grain cleaner through a bearing assembly (not shown). Wrapped about frame 70 to rotate therewith is an indent cylinder tube 78. Indent cylinder tube 78 is formed of a solid outer sheet 80 and a separate liner 82 having perforations 83 formed therethrough. To form the tube, sheet 80 and liner 82 are arranged in overlapping configuration, wrapped tightly about the frame (with the liner inside) and locked into position on the frame by means locking clamps 84. The liner is held in position by friction. Alternately, to assist in handling, liner 82 is secured to outer sheet 80 at at least one position. To facilitate both wrapping of the liner wall and replacement of the liner should it wear, the liner is secured, by a releasable means or by adhesives or welding along one of its side edges only, as indicated at 86, to the outer sheet. Preferably, the liner is formed of a material such as, for example, plastic which is lightweight, flexible and able to withstand continued use. Because of the simplicity of the design, the indent cylinder is easy to use and to replace to permit cylinder walls having other desired perforation sizes to be installed.

Figure 6B:
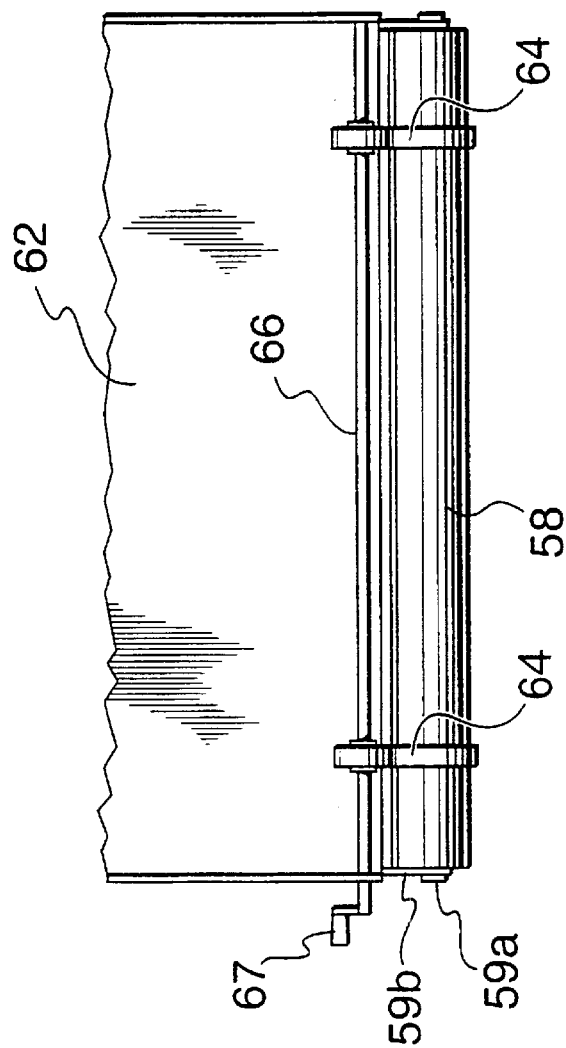
FIG. 6B is a front elevation view of the auger flight of FIG. 6A.
Figure 6A:
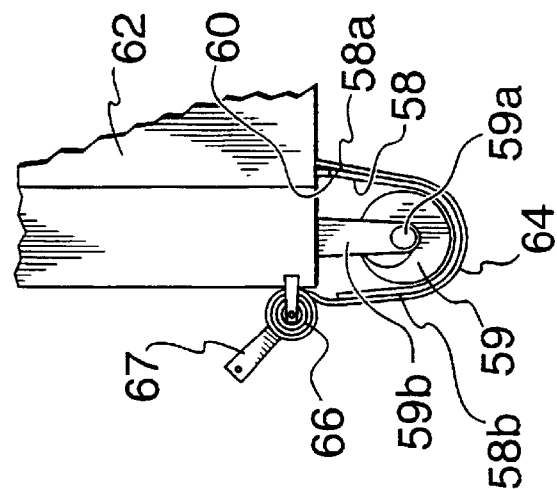
FIG. 6A is an end view of a auger flight useful in the present invention.

To assist in the conveyance of materials from chutes 24, 31 and 48 to an unloading position on the grain cleaner, an auger flight is preferably positioned to accept materials passing from each chute. In particular, auger flight 52 is positioned below chute 48, auger flight 54 is positioned below chute 24 and auger flight 56 is positioned below chute 31. To facilitate cleaning of auger flights 52, 54 and 56, preferably each auger flight includes a trough having a drop away bottom. The drop away feature can be provided in any suitable way. Since these auger flights are positioned under the grain cleaner, they are relatively inaccessible for actuation of the troughs. Thus, in a preferred embodiment a drop away trough which is easily manipulated is preferred. In particular, referring to FIGS. 6A and 6B, the preferred auger flight includes a trough 58 and an auger 59 disposed therein. Auger 59 is positioned in trough but is not supported by it. Instead auger 59 is supported at its ends by bearings 59a and brackets 59b. Trough 58 is pivotally connected at one side edge 58a through hinges 60 to the member 62 under which it is mounted. Opposite side edge 58b of trough 58 is not attached to member 62. However, by action of hinges 60, side edge 58b can be brought adjacent member 62. Flexible straps 64 are connected to the member 62 adjacent to side 58a and extend below trough 58 to a connection point on a reel 66 mounted on member 62 adjacent the opposite side edge 58b of trough 58. Rotation of reel 66 tightens or loosens straps 64 thereby driving trough to rotate about hinges 60 between a position in which side edge 58b is drawn up against member 62 and a position in which trough is free to pivot about hinges 60 to drop away from member 62. A separate reel can be provided for each strap. However, preferably one common elongate reel 66 is attached to act on more than one strap so that more than one strap can be actuated simultaneously. The reel is rotatable preferably by a single handle 67. Any number of straps can be used. Straps 64 are preferably formed of a durable flexible material such as woven metal or polymeric materials.

While the grain cleaner is primarily intended to be used such that grain is cleaned by use of both rotary screens 26 and indent cylinders 40, the grain cleaner can be used in other ways. For example, in one embodiment, the desired grain, after being separated from smaller materials in the rotary screens are simply passed to auger flight 56 for output from the cleaner. In another embodiment, the grain cleaner is used to separate desired grain from larger contaminants in the rotary screens (ie. termed scalping). In this embodiment, the desired grain is collected and conveyed in trough 34b. To facilitate such converted use of the grain cleaner, moveable gates 90 and 92 are provided in the chutes. Gates 90, 92 each include a gate plate 90a, 92a mounted on a hinge 90b, 92b, respectively. Gates 90, 92 each are preferably actuatable from outside of the grain cleaner by handles 90c, 92c extending though the housing. Where a module includes more than one of either the indent cylinder or the rotary screen, more than one gate 90 or 92 may be required. In a multiple gate embodiment, preferably one handle is provided for actuating the multiple gates in each chute. In a grain cleaner including multiple modules, preferably all similar gates are connected for common actuation. Gates 90, 92 can be positioned in other regions of the chutes or in other orientations, as desired.

The rotating members of the grain cleaner such as fan 19, rotary screens 26, auger 34c, indent cylinders 40 and the augers in auger flights 52, 54, and 56 can be driven in any suitable way such as for example by motors. Referring back to FIG. 1, preferably any members which are intended to be commonly actuated and rotated at a common speed are connected by means of sprocket drives and driven by one motor. This reduces the number of motors which are required and thereby simplifies the system. As an example, the four rotary screens, as shown in the illustrated embodiment, include sprockets 99 connected by a plurality of chains 100. A motor 104 is connected to one of the sprockets to impart rotational drive thereto. This rotational force is communicated to the other sprockets 99 by means of chains 100. In a preferred embodiment, augers 34c have sprockets 106 which are connected by chain drives 108 into the drive system for the rotary screens. Each indent cylinder 40 has a sprocket 110 and these sprockets are connected by a chain 112. A motor (not shown) is connected to one of the sprockets 110. Sprockets 110 are connected to drive both the rotation of the indent cylinder frames and augers 46 within the indent cylinders. Motors (not shown) are connected to drive the fan and the augers in auger flights 52, 54 and 56.

The motors can be driven in any desired way such as, for example, by an electrical system or a hydraulic system. In the illustrated embodiment, the motors are driven hydraulically. Preferably, the hydraulic fluid supply and pumping system 114 and fluid valving system 115 are carried on the grain cleaner. A plurality of hydraulic lines 116 carry hydraulic fluid to the motors. The pumping system can be driven by any suitable means. However, preferably, the pumping system is driven by an engine on the grain cleaner such as a gas powered generating engine 118. This arrangement provides that the grain cleaner can be driven in remote locations and without being attached to a separate power generation system. Preferably, all motorized components are driven by a power generation system selected to be of a power output suitable to support the entire system. This avoids complicated arrangements.

The hydraulic fluid valving system 115 is useful for controlling the rotation output speed of the motors. The valving system can have separate valves for controlling the flow of hydraulic fluid to each motor.

Figure 7:
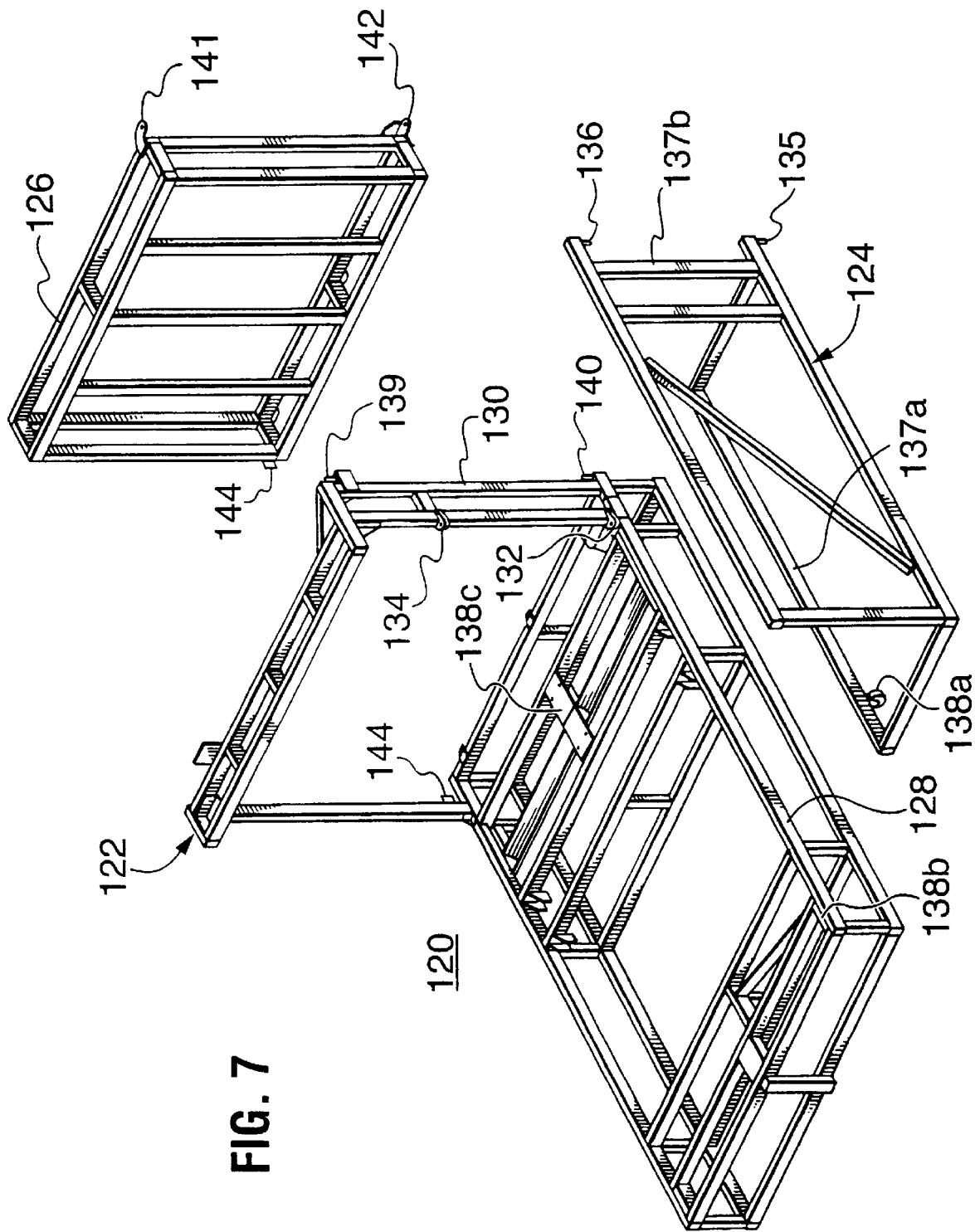
FIG. 7 is an exploded perspective view of a grain cleaner frame useful in the grain cleaner of the present invention.

In large grain cleaners it is sometimes difficult to access the components for repair or cleaning. In addition, in mobile grain cleaners the drive systems must at least in part be mounted adjacent the grain cleaning components. These drive systems sometimes block access to certain portions of the grain cleaner. The grain cleaner according to one aspect of the present invention has overcome these previous problems. Referring to FIG. 7, a grain cleaner frame 120 is provided including a main frame 122 onto which are pivotally mounted a module support frame 124 and a drive system support frame 126.

Main frame 122 includes a base assembly 128 and, extending upwardly therefrom, an end wall frame 130. Bearing 132 on base assembly 128 and bearing 134 on wall frame 130 accept pivot pins 135, 136, respectively on frame 124. When pins 135, 136 are positioned in bearings 132, 134, frame 124 is mounted on frame 122 but can pivot outwardly therefrom. To facilitate movement of frame 124 over base assembly 128, wheel 138a, roller 138b, low friction pad 138c and/or other parts are preferably provided on frame 124 or frame 122.

Module support frame 124 is formed to support a module of grain cleaning components thereon. In particular, a module of, for example, one or two rotary screens and/or one or two indent cylinders can be mounted, as by fasteners or welding, onto the bottom frame 137a and side structure 137b of module support frame 124. While not shown it is to be understood that another module of grain cleaning components can be positioned adjacent the module on frame 124. The other module can be mounted in fixed position on a frame 122 or can be mounted on its own support frame similar to frame 124. Where a larger grain cleaner is required, frame 122 can be expanded to support further modules with or without their own support frames.

When the grain cleaner is in use for cleaning grain, frame 124 is positioned entirely over main frame 122 and against end wall 130. However, when access is required to inner components of the modules, frame 124 can be pivoted outwardly to expose the inner components.

Locking means (not shown) can be provided to lock frame 124 into position for use on the main frame and to prevent inadvertent outward rotation of frame 124 from base 128.

Drive system support frame 126 supports many of the drive system components such as, for example, the hydraulic fluid supply and pumping system 114, the valving system 115 and the engine 118 (FIG. 1). Pivot pins 139, 140 on main frame 122 are positioned and formed to accept bearings 141, 142 on drive system support frame 126. Once bearings 141, 142 are supported on pins 139, 140, the frame 126 can pivot outwardly from wall 130. Lock parts 144 are provided for locking frame 126 against wall 130. During use for cleaning grain, frame 126 will normally be locked into position against frame end wall 130. When access is required to components behind frame 126, lock 144 is released and the frame is rotated outwardly away from wall 130.

To permit movement of the frames 124 and/or 126 outwardly, some connections may have to be disconnected. As an example, where chains 100 and 112 are used (FIG. 1), those chains which extend between modules must be disconnected before the modules can be rotated out from over the base of the main frame. Chain disconnection can be made by removal of a disconnect pin from the chain or by moving one of the sprockets out of engagement with the chain such that the chain is slackened off the other sprockets, as is known. Connections to the drive system, for example lines 116 can be formed from flexible materials such as tubing so that disconnections need not be made.

A hopper can be mounted on top of wall 130 and suitable clearance can be provided to permit the module on frame 124 and the frame 126 to rotate out from under the hopper. Auger flights 52, 54 and 56 can be secured within or under base frame 128 and chutes 24, 31 and 48 are positioned on their modules to align over the auger flights when the module is positioned over the base frame.

Figure 8A:
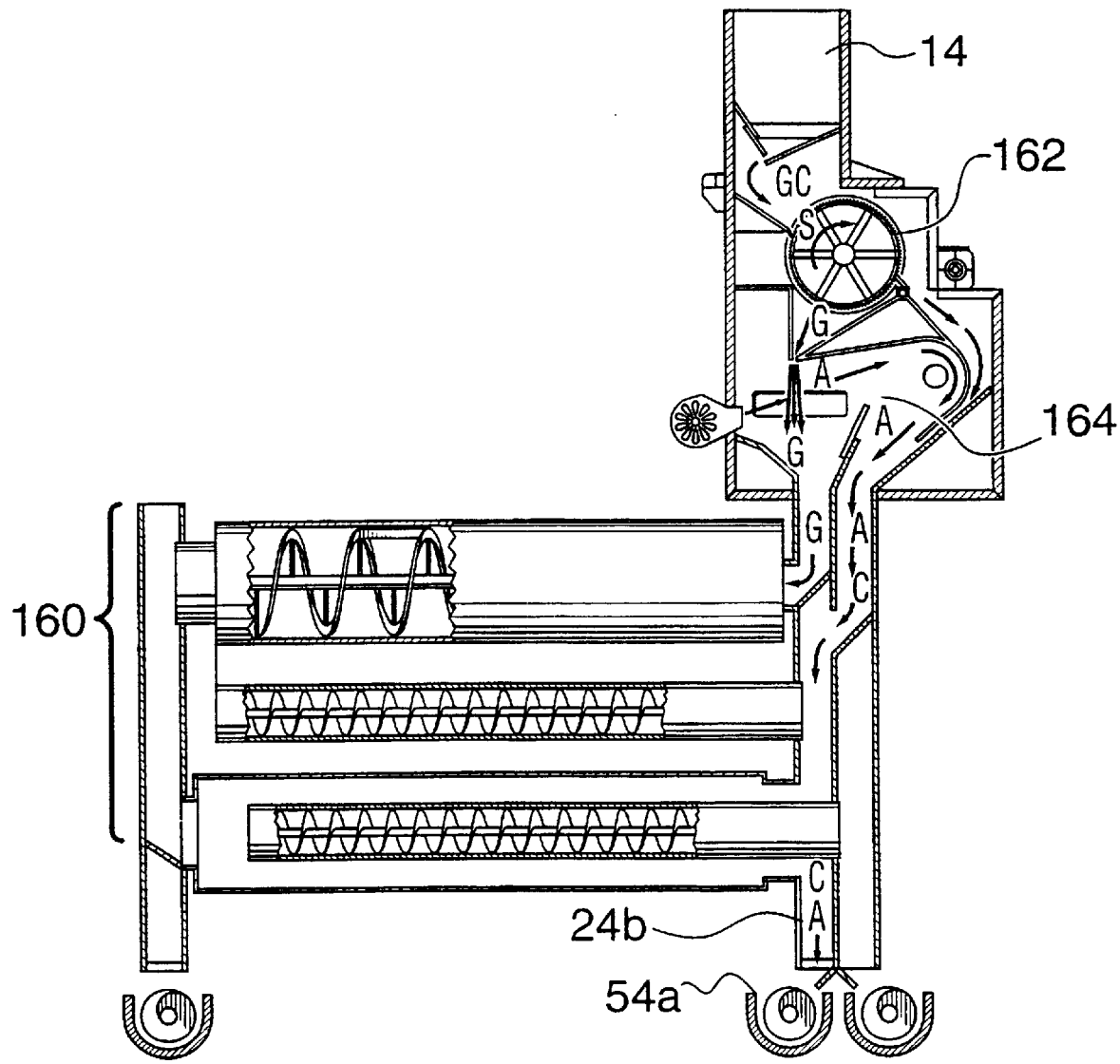
FIG. 8A is a schematic, sectional view through another grain cleaner according to the present invention.
Figure 8B:
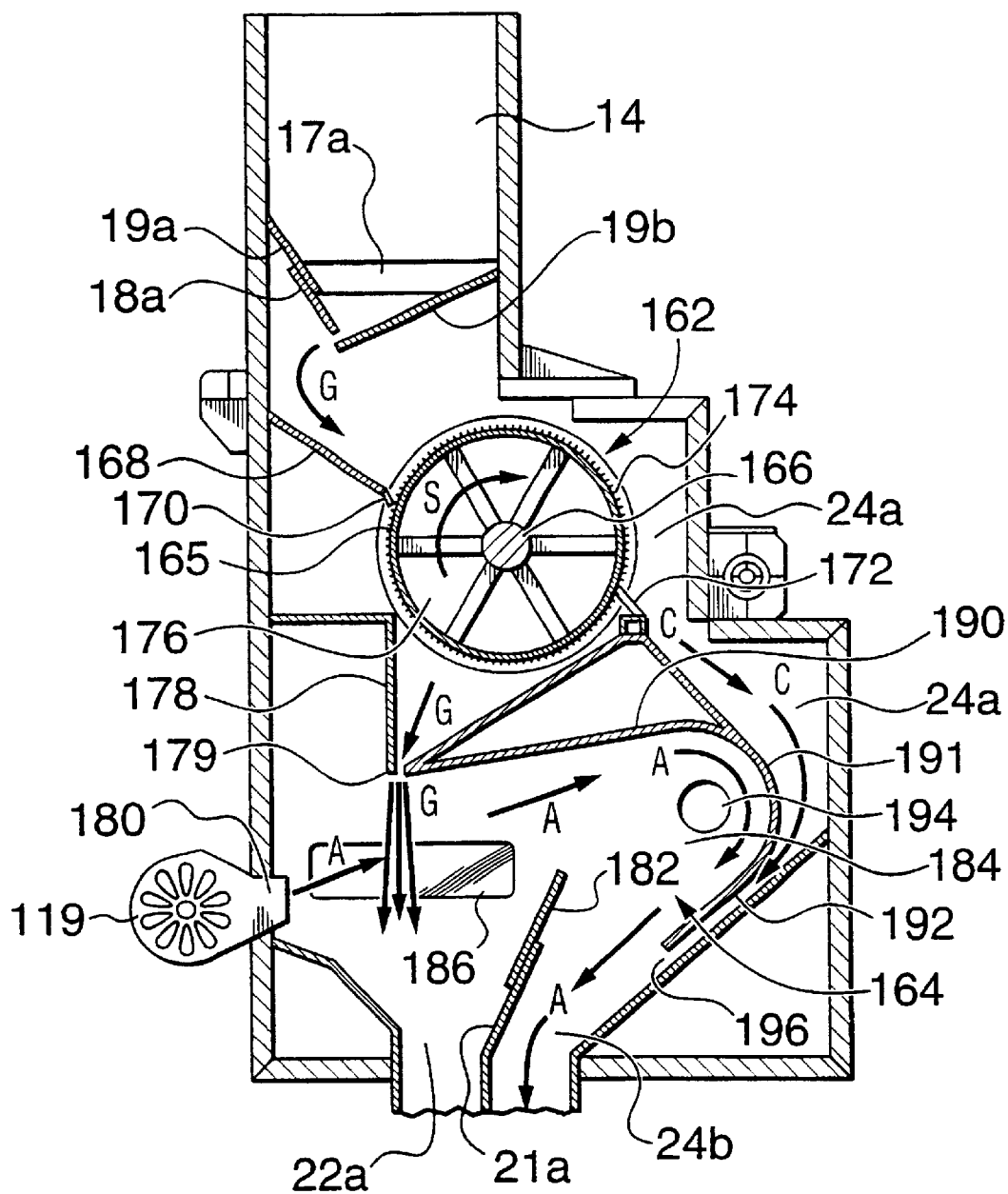
FIG. 8B is an enlarged sectional view of a scalping unit and air box of FIG. 8A.

Referring to FIGS. 8A and 8B, another grain cleaner according to the present invention is shown. In these figures, the flow of grain through the cleaner, where indicated, is shown by arrows G, the flow of air, where indicated, is shown by arrows A and the flow of contaminants, where indicated, is shown by arrows C. The grain cleaner includes a hopper 14, a scalper assembly 162, an air separator box 164 and further grain cleaning means 160. Scalper assembly 162 and air separator box 164 provide the first two stages of grain cleaning in the grain cleaner.

Hopper 14 acts as an inlet through which grain enters the grain cleaner. Hopper 14 is elongate and includes a plurality of deflection bars 17a positioned along the length of the hopper (only one can be seen as they are disposed one behind the other in the sectional view) to spread the grain along the hopper. A gate 18a controls grain outlet from the hopper. Gate 18a is elongate and is mounted on hopper wall 19a to slide thereover to move away from or close against opposite wall 19b. Gate 18a is made slidably moveable in any suitable way. In one embodiment, gate is mounted to slide over wall 19a and a sprocket (not shown) is mounted on hopper wall below gate 18a to engage a linear gear (not shown) on gate 18a. Rotation of the sprocket drives gate 18a to slide along wall 19a. A sliding closure arrangement for gate is preferred since such a closure arrangement provides greater control over the distance between gate 18a and wall 19b when compared to a pivotal gate closure.

The elongate curtain of grain passing through gate 18a flows into scalper assembly 162. Scalper assembly 162 includes a scalper screen 165 formed as a tube. Screen 165 is mounted on a frame and is rotatably driven about axle 166 in a direction as indicated by arrow s. Grain and contaminants which are fed onto screen 165 are directed into a hopper defined between a wall 168 and the outside of the screen. A brush 170 extends from wall 168 and is biased against screen 165 to prevent grain from passing between the screen and the wall.

Screen 165 has apertures therethrough therein which are sized to permit the desired grain to pass therethrough but to exclude larger sized grain contaminants such as straw, grain heads, animal droppings and rocks. As an example, a screen suitable for cleaning peas has apertures of about ½". Preferably, the solid surface area of the screen is low when compared to the open area of the apertures on the screen to facilitate passage of the grain through the screen.

Contaminants which are blocked from passing through screen 165 are moved by the rotational movement of the screen over the screen and into a waste material chute 24a. Preferably, a rubber member 172 is biased against screen 165 to remove materials which are stuck on the surface of the screen. To facilitate passage of materials over the screen, preferably, extensions 174 are formed on the outer surface of the screen to engage any grain or contaminants that are positioned against the screen. Where the screen is formed of woven wire mesh, the strands of wire extending along the length of the screen tube may extend a sufficient distance to act in the same way as, and therefore replace, extensions 174.

The grain which passes through screen 165 moves into its central space 176 and then again through screen 165 into another hopper 178. The grain then passes through an elongate opening 179 formed at the bottom of hopper 178 and into air separator box 164. Although not shown, preferably, the width of opening 179 is controlled by a gate.

The grain again flows as a thin curtain from opening 179 and into air separator box 164. Air separator includes a fan 119, a grain chute 22a through which the grain exits separator box 164 and a lower waste material chute 24b. A wall 21a divides chute 22a from chute 24b and is shaped and positioned to direct and grain falling against it into the grain chute. Preferably, wall 21a has mounted thereon an extendable baffle 182 which is extendable to adjust the height of wall 21a. Baffle 182 can be adjustable in any suitable way to select its degree of extension from wall 21a. Preferably, a handle extends through a side housing 184 of the air separator box to permit adjustment of the height of the baffle.

The curtain of grain passing through opening 179 is acted upon by a flow of air, indicated by arrows A, generated by fan 119. The flow of air acts to separate lighter contaminants from the curtain of grain. The degree of separation which is achieved in air separator box 164 is adjustable by selection of the direction of the air flow (i.e. by adjustment of fan nozzle 180), and by selection of the speed of the fan. In addition, the degree of separation can be selected by adjustment of the height of wall 21a as determined by baffle 182. The height of wall 21a determines which materials will be directed into grain chute 22a and which materials will be able to pass over into waste material chute 24b. A window 186 is formed through housing to permit observation of the separation procedure and, thereby, to facilitate adjustment of the baffle and the fan.

In some grain cleaners materials from air separation are exhausted to the environment. This presents an environmental concern, a maintenance concern as the materials sometimes clog air intakes etc. and also a concern to the operator who may inhale the materials. The air separator box of the present grain cleaner is enclosed to overcome these problems. In particular, air separator box 164 includes a wall 190 positioned opposite fan 119. Wall 190 prevents the separated materials from being blown out of the air box. In addition, wall 190 has a curved upper portion 191 and a lower portion 192 extending downwardly behind baffle 182 and towards a lower waste material chute 24b. Wall 190 thereby prevents the formation of a standing cyclone effect by directing the air flow carrying the separated materials into waste material chute 24b. If necessary, an opening 194 can be formed through housing adjacent curved upper portion 191 to substantially prevent the formation of any cyclone. The lower waste material chute includes various bends etc. which act as baffles to reduce the air's energy such that by the time chute 24b opens into an auger flight 54a, the material entrained in the air will generally fall into the auger flight and remain there to be acted on by the auger.

Waste material chute 24a converges and feeds into lower waste material chute 24b at open end 196. The air flow passing open end 196 creates a vacuum in waste material chute 24a and facilitates movement of materials therethrough from scalper 162.

The various embodiments of the present invention, as described above, provide a grain cleaner which is easy to maintenance and repair and can be easily converted for use in cleaning a variety of grain types (ie. peas, wheat, canola, etc.). A grain cleaner according to the present invention can be adjusted to correspond to any desired volume throughput. The grain cleaner can include a number of grain cleaning stages including in one embodiment, an early stage cleaner is provided for removing particularly problematic oversize contaminants such as animal droppings and rocks.

It will be apparent that many other changes may be made to the illustrative embodiments, while falling within the scope of the invention and it is intended that all such changes be covered by the claims appended hereto.

Embodiments of the invention in which an exclusive property or privilege is claimed are defined as follows:

1. A grain cleaner comprising: a framework, a grain inlet for accepting a flow of grain, grain cleaning means to separate the grain from at least some of its contaminants and a grain outlet to conduct the grain away from the grain cleaning means, the grain cleaning means including an air separator box having a grain inlet for permitting a flow of grain into the air separator box, the grain inlet formed to distribute the flow of grain into a thin curtain, a grain outlet positioned below the grain inlet such that the flow of grain passing from the grain inlet can drop, by gravity, into the grain outlet, a means for generating a flow of air and directing it toward the flow of grain between the grain inlet and the grain outlet, the means for generating being adjustable to select the direction of the flow of air acting on the flow of grain, a waste material outlet from the air box, the waste material outlet positioned such that the flow of air can pass into the waste material outlet without passing again through the flow of grain and a baffle positioned between the grain outlet and the waste material outlet, the baffle being adjustable in its degree of extension into the air separator box.

2. The invention as defined in claim 1 wherein means for generating a flow of air is a fan and the fan is adjustable to select for fan speed.

3. The invention as defined in claim 1 wherein the air box includes a wall and the means for generating a flow of air directs the flow of air towards the wall, the wall including a curved portion selected to direct the flow of air away from the upper portions of the air separator box and toward the waste material outlet.

4. The invention as defined in claim 3 further comprising an opening through the wall of the air box adjacent the curved portion, the opening positioned to counteract the formation of a standing cyclone effect in the air box.

5. The invention as defined in claim 1 wherein the grain cleaning means further includes a scalper having a tube rotatable along its long axis and including apertures disposed through its side wall, the apertures being selected to permit passage therethrough of the grain while excluding materials of size larger than the apertures and a grain hopper for directing the flow of grain against the tube's outer surface, the hopper including a wall positioned against the outer surface of the tube, the flow of grain being retained in the hopper between the wall and the outer surface of the tube until it passes through the apertures of the tube.

6. The invention as defined in claim 5 wherein a chute extends from the scalper and converges with the waste material outlet to convey excluded materials from the scalper to the waste material outlet, the chute opening into the waste material outlet in such a way that the flow of air passing through the waste material outlet creates a vacuum in the chute and draws air from the scalper into the waste material outlet.

7. The invention as defined in claim 1 wherein a first portion of the grain cleaning means is mounted on a support frame moveably mounted to the main framework such that the first portion of the grain cleaning means can be moveable between a first position and a second position on the main framework of the grain cleaner.

8. The invention as defined in claim 7 wherein a second portion of the grain cleaning means is positioned in side by side relation with the first portion of the grain cleaning means, the second portion of the grain cleaning means having inside components adjacent the first portion of the grain cleaning means and the support frame being moveable on the main framework to permit the first portion of the grain cleaning means to be moved outwardly from the second portion of the grain cleaning means to provide access to the inside components.

9. The invention as defined in claim 7 wherein the support frame is connected to the main framework by a pivotal connection and the support frame is moveable over the main framework by pivoting about the pivotal connection.

10. The invention as defined in claim 1, the grain cleaning means further comprising an indent cylinder assembly including a cylinder having an inner surface with a plurality of indentations formed thereon, the cylinder being formed of a sheet of material wrapped and releasably secured into a cylindrical form and mounted on a frame.

11. The invention as defined in claim 10 wherein the indent cylinder includes an outer sheet material and an inner perforated liner, the outer sheet material including a releasable locking means aligned along two opposite edges thereof for securing the outer sheet material into the cylindrical form.

12. The invention as defined in claim 11, the inner perforated liner being formed of a polymeric material.

13. The invention as defined in claim 11 wherein the inner perforated liner is secured to the outer sheet along an edge adjacent one of the opposite edges accommodating the locking means.

14. A grain cleaner comprising: a framework, a grain inlet for accepting a flow of grain, grain cleaning means to separate the grain from at least some of its contaminants and a grain outlet to conduct the grain away from the grain cleaning means, the grain cleaning means including (a) an air separator box having a grain inlet for permitting a flow of grain into the air separator box, a grain outlet positioned below the grain inlet such that the flow of grain passing from the grain inlet can drop, by gravity, into the grain outlet, a means for generating a flow of air and directing it toward the flow of grain between the grain inlet and the grain outlet, a waste material outlet from the air box, the waste material outlet positioned such that the flow of air can pass into the waste material outlet without passing again through the flow of grain and a baffle positioned between the grain outlet and the waste material outlet; (b) a scalper having a tube rotatable along its long axis and including apertures disposed through its side wall, the apertures being selected to permit passage therethrough of the grain while excluding materials of size larger than the apertures and a grain hopper for directing the flow of grain against the tube's outer surface, the hopper including a wall positioned against the outer surface of the tube, the flow of grain being retained in the hopper between the wall and the outer surface of the tube until it passes through the apertures of the tube and (c) a chute extending from the scalper and converging with the waste material outlet to convey excluded materials from the scalper to the waste material outlet, the chute opening into the waste material outlet in such a way that the flow of air passing through the waste material outlet creates a vacuum in the chute and draws air from the scalper into the waste material outlet.

15. The invention as defined in claim 14 wherein the grain cleaner is mounted on transportation means.

\* \* \* \* \*